United States Patent
Phelps

(10) Patent No.: US 9,458,585 B2
(45) Date of Patent: Oct. 4, 2016

(54) LEAKPROOF SPREADER DEVICE

(71) Applicant: NORTHERN STAR INDUSTRIES, INC., Iron Mountain, MI (US)

(72) Inventor: Jen Phelps, Niagara, WI (US)

(73) Assignee: THE TORO COMPANY, Bloomington, MN (US)

(*) Notice: Subject to any disclaimer, the term of this patent is extended or adjusted under 35 U.S.C. 154(b) by 196 days.

(21) Appl. No.: 14/245,865

(22) Filed: Apr. 4, 2014

(65) Prior Publication Data
US 2015/0284922 A1 Oct. 8, 2015

(51) Int. Cl.
| | | |
|---|---|---|
| B05B 17/04 | (2006.01) | |
| E01H 10/00 | (2006.01) | |
| E01C 19/20 | (2006.01) | |
| A01C 15/00 | (2006.01) | |
| A01C 17/00 | (2006.01) | |
| A01C 15/02 | (2006.01) | |
| B05B 3/10 | (2006.01) | |
| B05B 15/00 | (2006.01) | |
| B65D 88/66 | (2006.01) | |
| B65G 33/24 | (2006.01) | |
| B65D 88/68 | (2006.01) | |
| B65G 33/26 | (2006.01) | |

(52) U.S. Cl.
CPC ............. *E01H 10/007* (2013.01); *A01C 15/00* (2013.01); *A01C 15/007* (2013.01); *A01C 15/02* (2013.01); *A01C 17/00* (2013.01); *A01C 17/001* (2013.01); *B05B 3/1007* (2013.01); *B05B 15/003* (2013.01); *B65D 88/66* (2013.01); *B65D 88/68* (2013.01); *B65G 33/24* (2013.01); *B65G 33/265* (2013.01); *E01C 19/203* (2013.01); *E01C 2019/206* (2013.01)

(58) Field of Classification Search
CPC .... A01C 15/00; A01C 17/001; A01C 17/00; A01C 15/007; A01C 15/02; B05B 3/1007; B05B 15/003; E01H 10/007; E01C 19/203; E01C 2019/206; B65D 88/66; B65D 88/68; B65G 33/24; B65G 33/265
USPC ........... 239/7, 104, 142, 650, 659, 661, 663, 239/668, 681, 683, 687
See application file for complete search history.

(56) References Cited

U.S. PATENT DOCUMENTS

| | | | | |
|---|---|---|---|---|
| 1,643,143 | A | * | 9/1927 | Wilcox ................ A23G 3/2076 239/668 |
| 3,684,082 | A | * | 8/1972 | Wardell ................ B65G 33/00 198/677 |
| 6,089,478 | A | | 7/2000 | Truan et al. |
| 6,702,208 | B1 | | 3/2004 | Hadler et al. |
| 7,540,436 | B2 | | 6/2009 | Truan et al. |
| 8,262,004 | B2 | | 9/2012 | Gamble, II et al. |
| 9,127,425 | B2 | | 9/2015 | Outcalt et al. |
| 2011/0259979 | A1 | | 10/2011 | Kost et al. |

FOREIGN PATENT DOCUMENTS

WO WO-2014055161 A1 4/2014

OTHER PUBLICATIONS

International Search Report for PCT/US2013/055112, dated Dec. 4, 2013.

* cited by examiner

*Primary Examiner* — Steven J Ganey
(74) *Attorney, Agent, or Firm* — Marshall, Gerstein & Borun LLP

(57) ABSTRACT

A device for spreading a granular material over a road surface. The device includes a hopper fillable with the granular material and an agitating member configured to discharge the granular material from an outlet of the hopper. A brush is aligned with the outlet of the hopper and includes a plurality of bristles configured to inhibit leakage of the granular material from the outlet of the hopper during stoppage of the agitating member. Also provided are a system in which the spreader device is mounted on a vehicle, and a method of operating the spreader device.

24 Claims, 3 Drawing Sheets

LEAKPROOF SPREADER DEVICE

FIELD OF DISCLOSURE

The present disclosure relates generally to a device for spreading a granular material over a surface, and more particularly, to a tailgate spreader including an agitating member that discharges granular material from a hopper.

BACKGROUND

Granular materials such as salt, sand, magnesium chloride, calcium chloride, cinders, and/or other deicers are spread on roadways during the winter to help melt snow and ice. An automated spreader device is commonly employed to perform this task. Such spreader devices are used in conjunction with large trucks as well as smaller vehicles such as pickup trucks. A spreader device used in conjunction with a pickup truck is typically mounted on the tailgate and/or tow hitch of the pickup truck. One known spreader device employs a hopper for holding the granular material and an auger for urging the granular material toward an opening for discharging the granular material from the hopper. The discharged granular material falls onto a finned rotating spinner plate that propels the granular material in a radial pattern. This action distributes the granular material over a wide area of the road surface.

Granular material tends to leak from the outlet of the known spreader device, especially when the vehicle travels over bumps in the road. Even though the blade of the auger partially obstructs the outlet of the hopper when the auger is not rotating, granular material still may slip past the auger blade and fall out of the outlet. Consequently, when the vehicle is driven between spreading jobs, the granular material undesirably leaks from the hopper outlet even in the absence of auger rotation.

SUMMARY

Disclosed herein is a device for spreading a granular material including a frame, a hopper, an agitating member, a spinner plate and a brush. The frame is attachable to a vehicle. The hopper is supported by the frame and configured to hold the granular material. The agitating member is configured to discharge the granular material from an outlet of the hopper. A spinner plate is configured to spread the granular material discharged from the outlet of the hopper. A brush is aligned with the outlet of the hopper and includes a plurality of bristles configured to inhibit leakage of the granular material from the outlet of the hopper during stoppage of the agitating member.

Also disclosed is a system for spreading a granular material over a road surface. The system includes a vehicle, a hopper attached to a rear of the vehicle, an agitating member, a motor and a brush. The hopper is configured to hold the granular material. The agitating member includes a rotatable shaft and a blade configured to discharge the granular material from an outlet of the hopper. The motor is configured to rotate the rotatable shaft of the agitating member. The brush is aligned with the outlet of the hopper. The brush includes an outer peripheral rim and a plurality of bristles extending inwardly from the outer peripheral rim.

Further disclosed is a method of operating a spreader device. The spreader device includes a hopper filled with a granular material, an agitating member, a spinner plate and a brush aligned with an outlet of the hopper. The method includes rotating the agitating member to discharge the granular material from the outlet of the hopper and push the granular material through the brush so that the granular material falls onto the spinner plate. The method includes rotating the spinner plate to spread the granular material over a road surface. The method further includes stopping rotating of the agitating member, and inhibiting leakage of the granular material from hopper outlet with the brush during stoppage of the agitating member.

DETAILED DESCRIPTION

Figure 1:
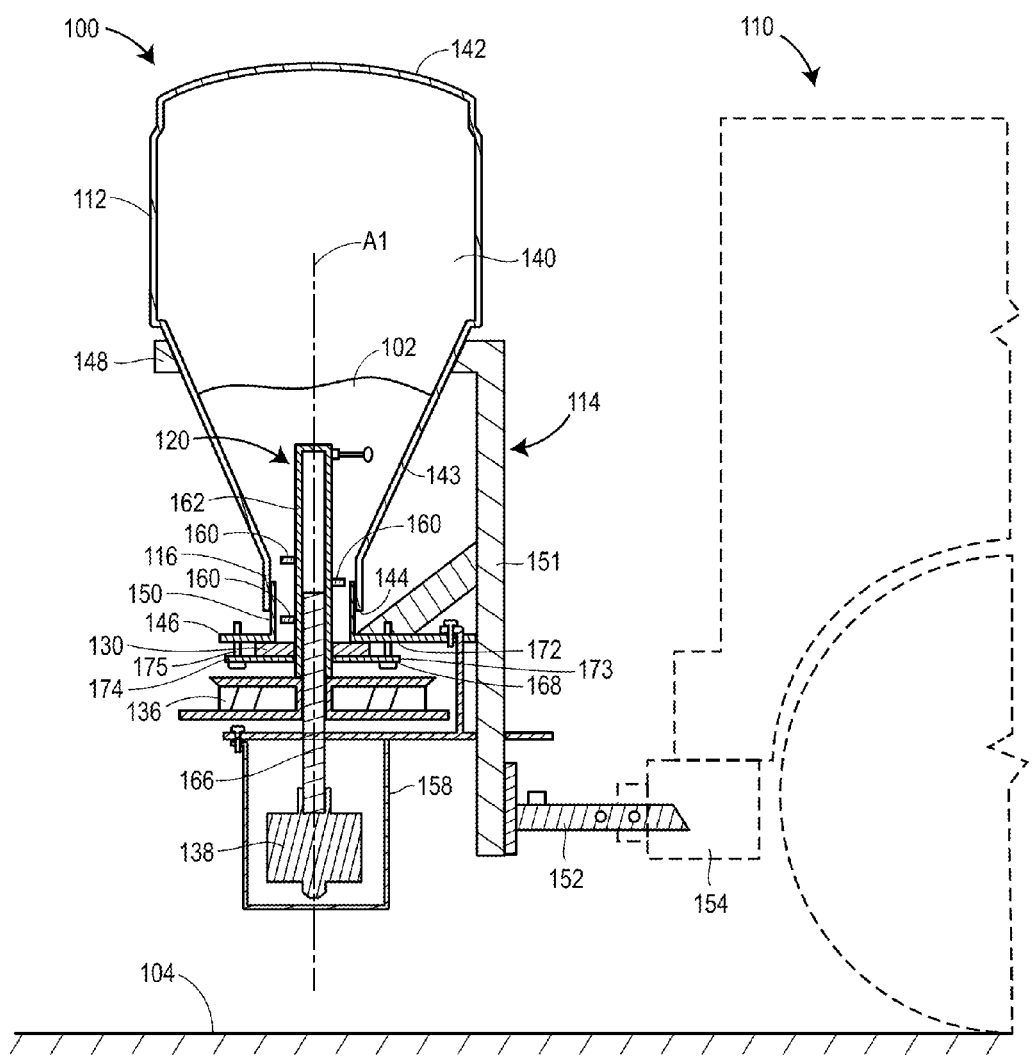
FIG. 1 illustrates a cross-sectional view of a spreader device mounted onto the rear of a vehicle.

FIG. 1 is a cross-sectional view of one embodiment of a spreader device 100 which can be used to spread a granular material 102 over a ground surface 104 in accordance with principles of the present disclosure. The spreader device 100 is mounted onto a rear of a vehicle 110 such as a pickup truck. The spreader device includes a hopper 112 supported by a frame 114 that is attached to the vehicle 110. The hopper 112 holds the granular material 102 and includes an outlet 116. An agitating member 120 positioned inside the hopper 112 is rotatable to discharge the granular material 102 from the outlet 116 of the hopper 112. A brush 130 including a plurality of bristles 132 is aligned with the outlet 116. A spinner plate 136 is arranged below the brush 130. Rotation of the spinner plate 136 propels the granular material 102 discharged from the hopper 112 in a radial pattern and thereby spreads the granular material 102 over the ground surface 104.

Generally, during operation of the spreader device 100, a motor 138 is controlled to rotate the agitating member 120. Rotation of the agitating member 120 exerts a downward force on the granular material 102 that pushes the granular material 102 through the outlet 116 and into contact with the brush 130. The bristles 132 of the brush 130 elastically deform as a result of the downward force exerted on the granular material 102. The deformation of the bristles 132 creates temporary openings in the brush 130 that allow the granular material 102 to pass through the brush 130. When the spreading job is finished, the motor 138 is controlled to stop rotation of the agitating member 120. During stoppage of the agitating member 120, the bristles 132 of the brush 130 return to their un-deformed shape. This action closes the temporary openings previously formed in the brush 130. With the bristles 132 in their original positions, the bristles 132 act as a barrier that inhibits leakage of the granular material 102 from the outlet 116 of the hopper 112. In some embodiments, the bristles 132 may completely prevent leakage of the granular material 102 from the outlet 116 of the hopper 112 during stoppage of the agitating member 120.

So configured, the spreader device 100 of the present disclosure advantageously inhibits leakage of the granular material 102 from the hopper 112 when the spreader 100 is not being operated to spread the granular material 102. This is particularly advantageous in the case where the vehicle carrying the spreader device 100 traverses a bumpy road, gravel road shoulders, and snow and ice-covered streets, when traveling between spreading jobs. Employing the brush 130 to close the outlet 116 of the hopper 112 also alleviates the operator from having to exit the cab of the vehicle in harsh winter conditions to manually close a shut-off valve upon completion of a spreading job. Also, the relative simplicity of the brush makes it easy to outfit an existing spreader device with the brush.

Each of the foregoing components of the spreader device 100 and methods of using the spreader device 100 will now be described in more detail.

The hopper 112 includes a hollow interior 140 configured to hold the granular material 102 prior to spreading. The granular material 102 is any kind of particulate material including, but not limited to, salt, sand, magnesium chloride, calcium chloride, cinders and/or other deicers, and can also be seeds and/or fertilizer. The upper end 141 of the hopper 112 may include a removable lid 142 that allows the hollow interior 140 to be filled with the granular material 102. A lower portion 143 of the hopper 112 may be funnel-shaped so that a diameter of the lower portion continuously decreases in a downward direction toward the outlet 116. The bottommost portion of the hopper 112 forms the outlet 116. In one embodiment, the outlet 116 possesses a constant diameter. The outlet 116 includes an open end 144 through which the granular material 102 is discharged during operation.

The frame 114 supports the hopper 112 by way of a mounting plate 146 and a ring-shaped bracket 148. The mounting plate 146 is positioned below the hopper 112 and includes an upwardly extending sleeve 150 that extends into the open end 144 of the outlet 116. An outer diameter of the upwardly extending sleeve 150 may be slightly smaller than an inner diameter of the outlet 116 such that an interference fit is formed between the upwardly extending sleeve 150 and the outlet 116. In one embodiment, a threaded connection is formed between the outlet 116 and the upwardly extending sleeve 150 so that the upwardly extending sleeve 150 can be screwed over the outlet 116. The ring-shaped bracket 148 encircles the exterior of hopper 112 and laterally supports the hopper.

The frame 114 includes an upright member 151 extending between the ring-shaped bracket 148 and the mounting plate 146. In one embodiment, the ring-shaped bracket 148 and the mounting plate 146 are screwed to the upright member 151. A tow bar 152 is fixed to the bottom end of the upright member 151 an provides a mechanism for attaching the spreading device 100 to a tow hitch 154 located at the rear of the vehicle 110. Also affixed to the bottom end of the upright member 151 is a motor housing 158.

Figure 2:
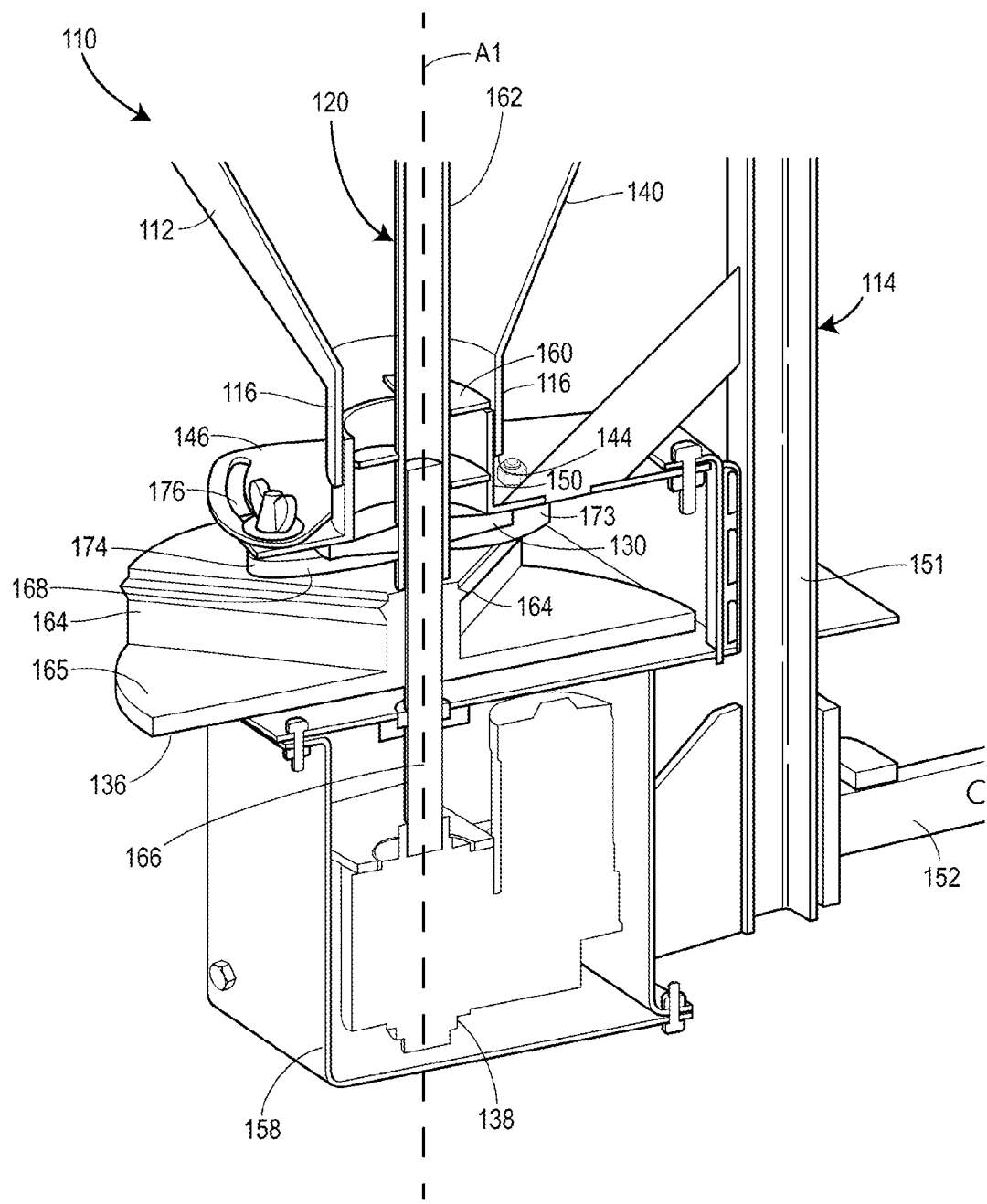
FIG. 2 is perspective cutaway view of the spreader device illustrated in FIG. 1.

The agitating member 120 depicted in FIGS. 1 and 2 is configured as an auger. Alternative embodiments of the agitating member 120 can be arranged differently, for example, as a rotatable shaft with non-helical fan blades, as a whisk, and/or as a vibrating elongate member. The illustrated embodiment of the agitating member 120 includes a blade 160 and a rotatable shaft 162 that extends along a rotational axis A1 between the interior 140 of the hopper 112 and the motor 138. In one embodiment, the blade 160 is a helical screw blade. In other embodiments, the blade 160 may have a tapered, conical or other suitable shape. The blade 160 outwardly protrudes from a portion of the rotatable shaft 162 near the outlet 116 of the hopper 112. Rotation of the blade 160 exerts a downward force on the granular material 102 that discharges the granular material 102 from the open end 144 of the outlet 116. As depicted in FIG. 2, the rotatable shaft 162 may be hollow so that a drive shaft 166 of the motor 138 can be inserted into the rotatable shaft 162. The drive shaft 166 may be removably connected to the rotatable shaft 162 by screws or pins to facilitate assembly and disassembly of the spreader device 100.

The motor 138 is connected to the lower end of the drive shaft 166. The motor 138 rotates the drive shaft 166 about the rotational axis A1, which in turn rotates the rotatable shaft 162 about the rotational axis A1. The motor 138 is powered by electricity and/or hydraulic fluid. In one embodiment, the motor 138 is a gas engine. The motor 138 can be controlled to operate at different rotational speeds, and may be connected to a controller (not shown) enabling a driver to control the speed of the motor 138 while driving. While the motor 138 of the present embodiment is aligned with the rotatable shaft 162, alternative embodiments could be arranged differently, for example, with the motor 138 offset from the rotatable shaft 162 and rotationally connected to the rotatable shaft 162 via a gear mechanism.

The spinner plate 136 is positioned below the outlet 116 of the hopper 112 so that the granular material 102 discharged from the outlet 116 falls onto the spinner plate 136. The rotatable shaft 162 of the agitating member 120 passes through a hole in the center of the spinner plate 136. In one embodiment, the rotatable shaft 162 is fixed to the hole in the spinner plate 136 such that the spinner plate 136 rotates together with the rotatable shaft 162. In other embodiments, the spinner plate 136 rotates independently of the rotatable shaft 162. As illustrated in FIG. 2, the spinner plate 136 includes a circular plate 165 and a plurality of upright panels 164. Rotation of the upright panels 164 propels the granular material 102 in a radial pattern, thereby spreading the granular material 102 over the ground surface 104.

Figure 3:
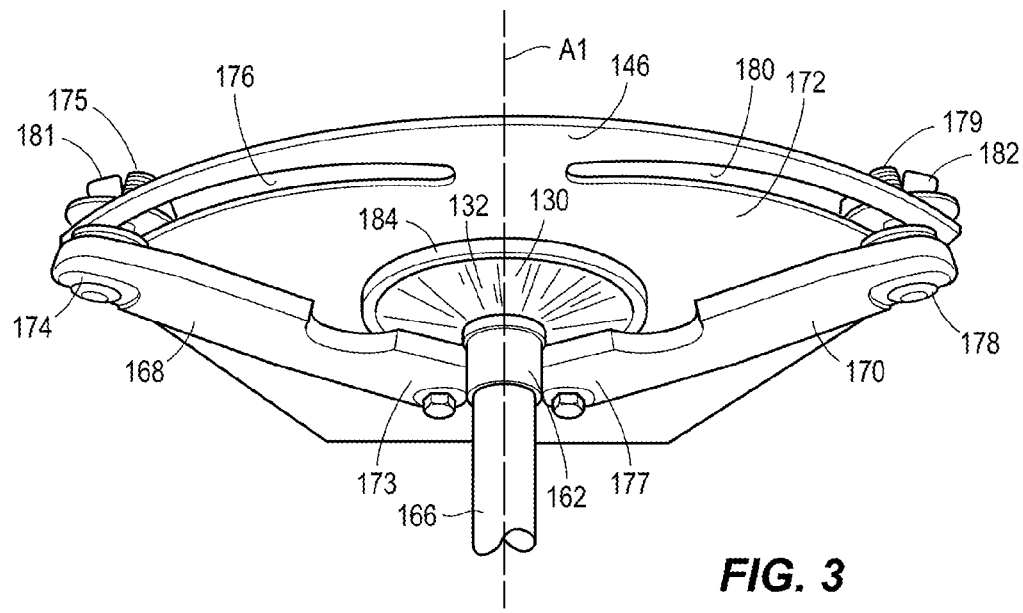
FIG. 3 is perspective view of an underside of the brush and the mounting plate of the spreader.

FIG. 3 illustrates that a first adjustable arm 168 and a second adjustable arm 170 clamp the brush 130 against a downwardly facing surface 172 of the mounting plate 146. Clamping the brush 130 against the mounting plate 146 facilitates removal of the brush 130, for example, to clean or replace the brush 130 with a replacement brush. The first adjustable arm 168 includes a first end 173 rotatably connected to the mounting plate 146 and a second end 174 having an upwardly extending projection 175 which slides within a first slot 176 formed in the mounting plate 146. Similarly, the second adjustable arm 170 includes a first end 177 rotatably connected to the mounting plate 146 and a second end 178 having an upwardly extending projection 179 slidable within a second slot 180 formed in the mounting plate 146. A first fastener 181 is rotatably connected to the upwardly extending projection 175 to fix the position of the upwardly extending projection 175 relative to the first slot 176. A second fastener 182 is rotatably connected to the upwardly extending projection 179 to fix the position of the upwardly standing projection 179 relative to the second slot 180. Rotating the adjustable arms 168 and 170 between different positions causes the adjustable arms 168 and 170 to cover more or less of the brush 130. Accordingly, the adjustable arms 168 and 170 can be used to adjust the rate at which the granular material 102 is discharged from the outlet 116 of the hopper 112.

While the brush 130 of the present embodiment is clamped against the mounting plate 146, in some embodiments the brush 130 may bolted to the mounting plate 146, or alternatively, formed in one-piece with the mounting plate 146. In still further alternative embodiments, the brush 130 may include a threaded region, such as an outer thread that allows the brush 130 to be screwed into the upwardly extending sleeve 150 and/or screwed into the outlet 116 of the hopper 112.

The brush 130 is aligned with the outlet 116 of the hopper 112 such the rotatable shaft 162 passes through the brush 130. In one embodiment, the rotational axis A1 of the rotatable shaft 162 passes centrally through the brush 130. The brush 130 includes an outer peripheral rim 184 and a plurality of bristles 132 that extend inwardly from the outer peripheral rim 184. Accordingly, the bristles 132 extend from the outer peripheral rim 184 toward the rotatable shaft 162. In some embodiments the bristles 132 are orthogonal to the longitudinal axis A1 of the rotatable shaft 162, while in other embodiments, the bristles 132 form an acute or obtuse angle with the longitudinal axis A1 of the rotatable shaft 162. The outer peripheral rim 184 may be circular, triangular, square, rectangular or any other suitable shape. An embodiment of the brush 130 with a circular outer peripheral rim 184 may take the shape of a disk. When the outer peripheral rim 184 is circular, the brush 130 may take the shape of a disk. In one embodiment, an outer diameter D1 of the circular outer peripheral rim 184 of the brush 130 is approximately (e.g., ±10%) 4.0 inches, or lesser or greater. The outer diameter D1 is greater than or equal to a maximum dimension of the open end 144 of the outlet 116 so that the brush 130 covers the open 144 of the outlet 116 when viewed from the bottom along the rotational axis A1.

Figure 4:
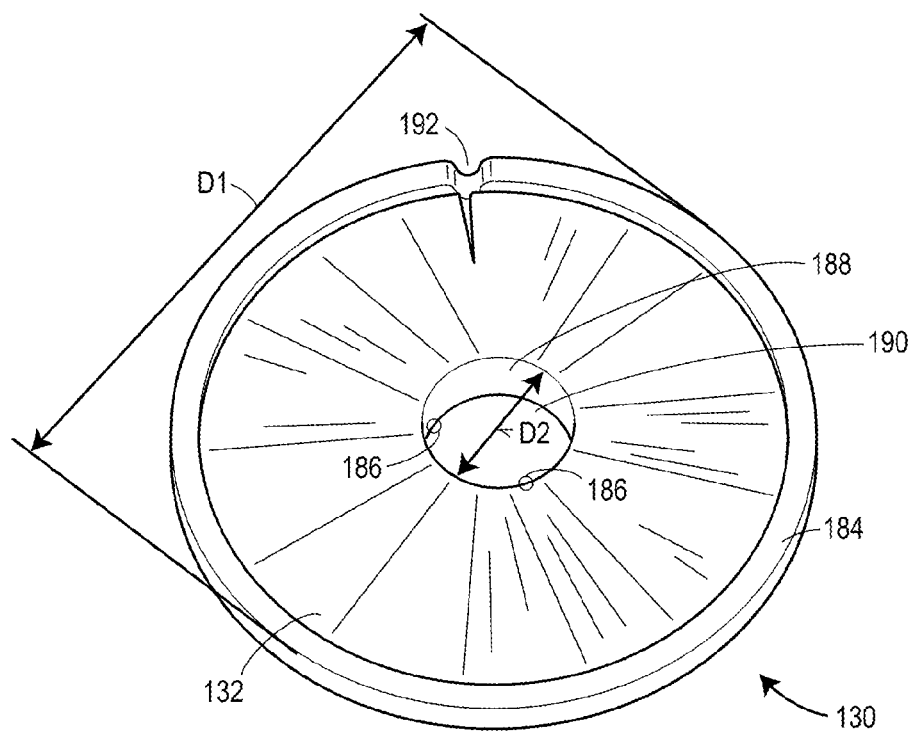
FIG. 4 is a perspective view of the brush used in the spreader device.

As illustrated in FIG. 4, each of the bristles 132 extends from the outer peripheral rim 184 in the inward radial direction and terminates at a respective free end 186. The free ends 186 of the bristles 132 are arranged to define a periphery 188 of a hole 190 that extends through the brush 130. The rotatable shaft 162 of the agitating member 120 passes through the hole 190. The inner diameter D2 of the hole 190 is approximately (e.g., ±10%) 1.0 inches, or lesser or greater. The inner diameter D2 of the hole 190 is equal to, or slightly less than, the diameter of the rotatable shaft 162 so that free ends 186 of the bristles 132 press against the rotatable shaft 162.

The outer peripheral rim 184 is formed of a rigid material such as steel, and the bristles 132 are made of a flexible material such as nylon. The bristles 132 are densely packed in an overlapping configuration so that relatively few, if any, gaps or openings exist between the bristles 132 when the bristles 132 are un-deformed. The bristles 132 thus provide a barrier that inhibits leakage of the granular material 102 from the outlet 116 of the hopper 112 when the bristles 132 are arranged in their natural, un-deformed configuration. When the bristles 132 are bent, for example by the downward force exerted on the granular material 102 by the rotation of the agitating member 120, the bristles 132 separate slightly from each other and thereby form temporary openings. These temporary openings are large enough for the granular material 102 to pass through the bristles 132. When the agitating member 120 ceases to rotate, the bristles 132 elastically recover their original, un-deformed shapes and thus inhibit leakage of the granular material 102 from the outlet 116.

In one embodiment, the blade 160 of the agitating member 120 contacts the bristles 132 of the brush 130. The blade 160 may even extend through the bristles 132 of the brush 130 such that a portion of the blade 160 is exposed. Having the blade 160 the bristles 132 may help push the granular material 102 through brush 130 during operation.

To operate the spreading device 100, an operator (e.g., a driver of the vehicle 110) turns on the motor 138 to rotate the agitating member 120. Rotation of the agitating member 120 causes the blade 160 to exert a downward force on the granular material 102 located near the bottom of the hopper 112. This downward force discharges the granular material 102 from the outlet 116, and then through the sleeve 163 of the mounting plate 146 and into contact with the bristles 132 of the brush 130. The force of the granular material 102 causes the bristles 132 of the brush 130 to bend and slightly separate from each other. This action creates temporary openings in the brush 130 that allow the granular material 102 to pass through the brush 130. After passing through the brush 130, the granular material 102 falls onto the spinner plate 136, which is rotated by virtue of its connection to the agitating member 120. In an alternative embodiment where the spinner plate 136 is not connected to the agitating member 120, the operator may turn on a separate motor to rotate the spinner plate 136. Rotation of the spinner plate 136 causes the panels 164 to strike the falling granular material 102 and thereby propel the granular material 102 in the radial direction. As a result, the granular material 102 is distributed over a relatively large area of the ground surface 104.

When the spreading job is complete, the operator turns off the motor 138 to stop rotation of the agitating member 120. Consequently, the agitating member 120 no longer exerts a downward force on the granular material 102. In the absence of the downward force, the bristles 132 regain, or substantially regain, their original, un-deformed shape. The temporary openings or gaps previously formed in the bristles 132 during rotation of the agitating member 132 are thereby closed, or substantially closed. In this configuration, the bristles 132 inhibit the granular material 102 from passing through the brush 130. Accordingly, leakage of the granular material 102 from the outlet 116 of the hopper 112 is inhibited during stoppage of the agitating member 120.

To remove the brush 130, for example, to clean the brush 130 or replace the brush 130 with a new brush, an operator unclamps the brush 130 from the mounting plate 146. This action involves spreading apart the first and second adjustable arms 168 and 170 so that the operator can better access the brush 130. The operator then removes the brush 130 from the rotatable shaft 162. The outer peripheral rim 184 of the brush 130 may include a slit 192, as illustrated in FIG. 4, that allows the operator to remove the brush 130 from the rotatable shaft 162 by pulling the brush 130 in the radial direction such that the rotatable shaft 162 passes through the slit 192.

While the spreader device has been described in conjunction with a small vehicle such as pickup truck, the spreader device can be configured for use with large vehicles such as dump trucks, tractors, loaders and other heavy machinery. Implementing the spreader device in a dump truck may involve configuring the bed of the dump truck as the hopper.

The present disclosure advantageously provides a spreader device that is not susceptible to undesirable leakage of a granular material when the spreader device is not in use. The spreader device reduces the likelihood that granular material inadvertently falls out of the hopper outlet during transport of the spreader device between spreading jobs. The spreader device is particularly advantageous in cases where the vehicle carrying the spreader device travels significant distances over bumpy roads when moving between spreading jobs. The spreader device of the present disclosure also saves the operator from having to exit the cab of the vehicle in harsh winter conditions after completion of a spreading job to manually close a valve for the hopper outlet.

While the present disclosure has been described with respect to certain embodiments, it will be understood that variations may be made thereto that are still within the scope of the appended claims.

What is claimed is:

1. A device for spreading a granular material comprising:
a frame attachable to a vehicle;
a hopper supported by the frame and configured to hold the granular material;
an agitating member configured to discharge the granular material from an outlet of the hopper;
a spinner plate configured to spread the granular material discharged from the outlet of the hopper; and
a brush aligned with the outlet of the hopper, the brush including an outer peripheral rim and a plurality of bristles extending inwardly from the outer peripheral rim, the plurality of bristles being flexible relative to the outer peripheral rim and configured to inhibit leakage of the granular material from the outlet of the hopper during stoppage of the agitating member.

2. The device of claim 1, the agitating member including a rotatable shaft that passes through the plurality of bristles.

3. The device of claim 2, at least some of the bristles extending inwardly from an outer peripheral rim of the brush toward the rotatable shaft of the agitating member.

4. The device of claim 2, wherein each of the bristles extends radially inwardly from the outer peripheral rim of the brush and terminates at a respective free end, the free ends of the bristles defining a periphery of a hole, with the rotatable shaft of the agitating member passing through the hole.

5. The device of claim 1, the outer peripheral rim being circular, wherein at least some of the bristles extend radially inwardly from the outer peripheral rim.

6. The device of claim 5, wherein an outer diameter of the outer peripheral rim of the brush is greater than or equal to a maximum dimension of an open end of the outlet of the hopper.

7. The device of claim 1, wherein the brush is positioned exterior to the outlet of the hopper.

8. The device of claim 1, comprising a mounting plate possessing an upwardly extending sleeve that extends into the outlet the hopper.

9. The device of claim 8, the brush being clamped against a downwardly facing surface of the mounting plate.

10. The device of claim 1, wherein the brush is disk-shaped and aligned with a rotational axis of the agitating member.

11. The device of claim 1, the agitating member being an auger.

12. A system for spreading a granular material over a road surface comprising:
a vehicle;
a hopper attached to a rear of the vehicle and configured to hold the granular material;
an agitating member including a rotatable shaft being configured to discharge the granular material from an outlet of the hopper;
a motor configured to rotate the rotatable shaft of the agitating member;
a brush aligned with the outlet of the hopper, the brush including an outer peripheral rim and a plurality of bristles; and
wherein each of the bristles extends radially inwardly from the outer peripheral rim of the brush and terminates at a respective free end, the free ends of the bristles defining a periphery of a hole, with the rotatable shaft of the agitating member passing through the hole.

13. The system of claim 12, comprising a spinner plate configured to spread the granular material discharged from the outlet of the hopper over a road surface.

14. The system of claim 12, comprising a mounting plate possessing an upwardly extending sleeve that extends into the outlet the hopper.

15. The device of claim 14, the brush being clamped against a downwardly facing surface of the mounting plate.

16. The system of claim 12, wherein the outer peripheral rim of the brush is circular and an outer diameter of the outer peripheral rim of the brush is greater than or equal to a maximum dimension of an open end of the outlet of the hopper.

17. The system of claim 13, the agitating member being an auger.

18. A method of operating a spreader device including a hopper filled with a granular material, an agitating member, a spinner plate and a brush aligned with an outlet of the hopper, the method comprising:
rotating the agitating member to discharge the granular material from the outlet of the hopper and push the granular material through the bristles of the brush so that the granular material falls onto the spinner plate;
rotating the spinner plate to spread the granular material over a road surface;
stopping rotation of the agitating member; and
inhibiting leakage of the granular material from the outlet of the hopper with the brush during stoppage of the agitating member.

19. The method of claim 18, wherein the brush includes a plurality of bristles, and the agitating member passes through the bristles.

20. The method of claim 19, the brush including an outer peripheral rim, the bristles extending inwardly from the outer peripheral rim toward the rotatable shaft of the agitating member.

21. The method of claim 19, wherein each of the bristles extends from an outer peripheral rim of the brush and terminates at a respective free end, the free ends of the bristles defining a periphery of a hole, with the rotatable shaft of the agitating member passing through the hole.

22. The method of claim 19, the agitating member being an auger.

23. The method of claim 18, comprising clamping the brush to an underside of a mounting plate possessing a sleeve that extends into the outlet of the hopper.

24. The method of claim 23, comprising unclamping the brush from the underside of the mounting plate and clamping a replacement brush to the underside of the mounting plate.

* * * * *